July 13, 1971     M. P. TULIN     3,592,763
DYNAMICALLY FORMED, REVERSE OSMOSIS MEMBRANES
Filed Feb. 21, 1968     2 Sheets-Sheet 1
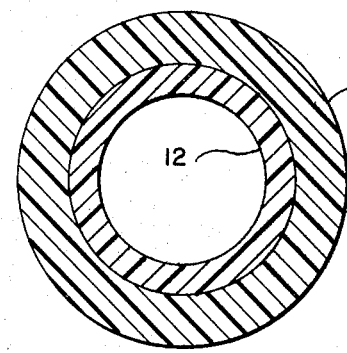
FIG. 1
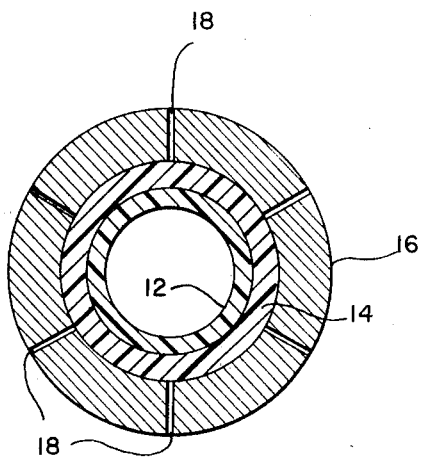
FIG. 2
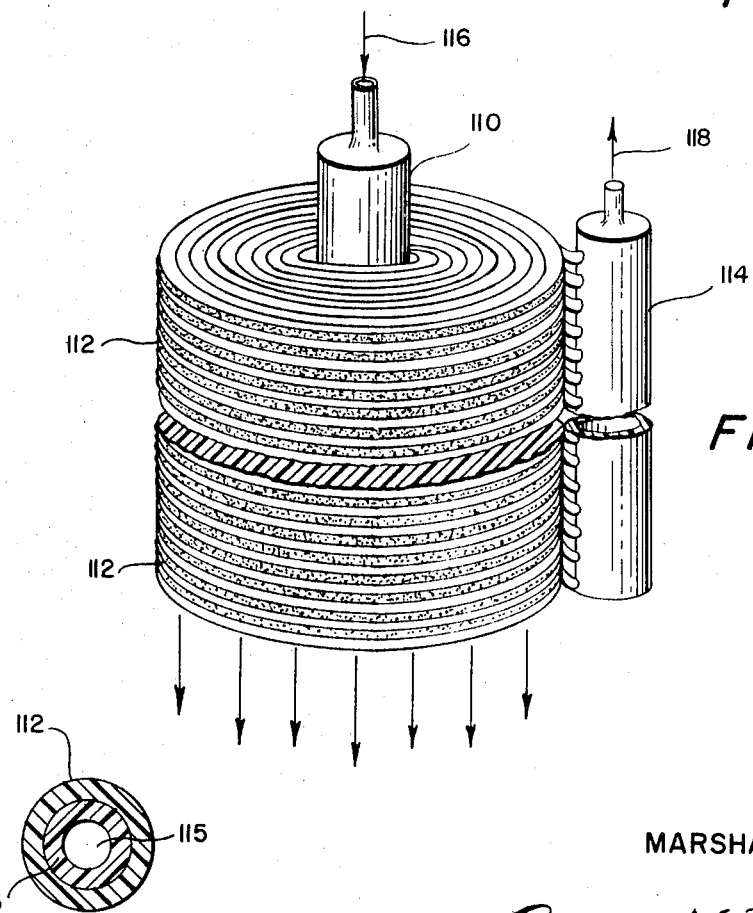
FIG. 4
FIG. 5
INVENTOR
MARSHALL P. TULIN
BY George N. Robillard
ATTORNEY

INVENTOR
MARSHALL P. TULIN

BY George N. Robillard
ATTORNEY

United States Patent Office 3,592,763
Patented July 13, 1971

3,592,763
DYNAMICALLY FORMED, REVERSE OSMOSIS MEMBRANES
Marshall P. Tulin, Bethesda, Md., assignor to Hydronautics, Incorporated, Laurel, Md.
Filed Feb. 21, 1968, Ser. No. 707,258
Int. Cl. B01d 13/00
U.S. Cl. 210—23
8 Claims

ABSTRACT OF THE DISCLOSURE

Tubular membranes are hydrodynamically formed within a porous tubular support to form a porous structure, and saline water is supplied under pressure to the interior of the resulting structure to recover water having a low salt concentration outside of the tubular support. When it becomes necessary to replace the tubular membrane, the supply of saline water is discontinued and a solvent is forced axially along the tubular membrane to dissolve it. Subsequently, the tubular membrane is hydrodynamically regenerated and the reverse-osmosis operation can be resumed.

---

This invention relates to the formation of tubular members. More particularly it relates to processes and apparatus for hydrodynamically forming tubular members, and to the use of such members in desalinizing aqueous liquids.

Extensive research programs have been carried out to solve the problem of recovering fresh water, economically, from saline water, such as sea water or brackish water. These research programs have investigated many methods of recovering fresh water from saline water most of which involve heat transfer operations. However, the search for a recovery method that can economically produce large quantities of fresh water goes on.

One promising fresh water recovery process which has been developed involves a phenomenon known as reverse osmosis. It has been found that when salt water is pushed against a particular type of membrane under a hydraulic pressure somewhat greater than the osmotic pressure of the salt solution, fresh water flows through the membrane from the salt water side. The basic concepts of reverse osmosis and suitable compositions for use in reverse-osmosis membranes are described, for example, in: Patent No. 3,133,132, High Flow Porous Membranes for Separating Water From Saline Solutions; Patent No. 3,133,137, High Flow Porous Membranes for Separating Water From Saline Solutions; Patent No. 3,170,867, Desalinization Properties of High Flow Porous Membranes by Pressure Treatment Using Aluminum Ion; and Patent No. 3,310,488, Method of Desalinizing Water. The disclosure of these patents is incorporated in this application by reference.

The economics of the desalination of water by reverse osmosis appear promising because the process makes efficient use of energy, and avoids the use of relatively high temperatures which result in the severe corrosion and scale problems generally encountered in heat-transfer water purification systems. Reverse-osmosis processes also are advantageous because they can achieve purification of high-salt-concentration water in one or two steps with a resultant economy in equipment size and cost.

A major obstacle to the development of economically feasible processes and apparatus using reverse-osmosis techniques has been the tendency of the permeable membranes used in such techniques to require servicing either by mechanical or chemical cleaning, and to require replacement because of damage resulting from scaling and chemical attack in service.

The four types of reverse-osmosis modules currently of interest are listed below.

(1) The flat plate module: Membranes in the form of flat sheets are supported on suitable porous backing plates and assembled in stacks enclosed in a pressure vessel.

(2) The tubular module: Membranes are preformed in tubular shape by mechanical means, fitted into rigid support pressure tubes provided with a series of holes for the product effluent, and the tubes connected in series and/or parallel arrangements. The membranes are generally wrapped with a low resistance support mesh to prevent them from being blown out through the holes in the support tubes. In a variation of this system, tubular modules are provided from rigid porous tubing made of glass fibers impregnated with polyester resin or other binder.

(3) The spiral module: One rectangular membrane is placed on top of another membrane of the same size with a flexible plastic mesh separator between them. The two membranes are then secured to each other along three sides and the assembly is rolled up in spiral form with another supporting mesh to separate the rolled up membrane surfaces. The saline feed is forced into one end of the spiral tube, fresh water flows through the membranes, and the product flows along the inner space between the membranes, along the coiled surfaces, and out through the open side.

(4) The hollow fiber module: A bundle of microcapillary tubes (about 25 microns in diameter) is placed in a pressure vessel and the saline feed is introduced under pressure at the outside of the fiber tubes. The product permeates through the tubes. Although the material from which the tubes are made has a very low permeability, this is offset by the very large surface areas available in such thin tubes.

These prior art types of reverse-osmosis modules all have many disadvantages, associated particularly with the need to service the membranes either by mechanical or chemical cleaning, and to replace them on account of damage by scaling and chemical attack in service.

In the flat plate module and spiral module systems, servicing is a particular lengthy operation because the complete assembly must be dismantled for cleaning or repair and there is no method available to localize faulty membranes.

The tubular module is more amenable to maintenance, since each section can be checked individually and isolated from the remainder of the plant for membrane replacement. However, as heretofore conceived, the tubular arrangement has the disadvantage of being bulky in size (utilizing relatively large and rigid support tubes), and requires large numbers of special, high pressure pipe fittings for assembly. In addition, the mechanical preparation of the membrane tubes requires many man hours of labor in membrane casting, membrane tube wrapping, insertion of the tube assembly into support pressure tubes, and conditioning of the completed tube assembly. All of these steps must be carried out preparatory to assembly of the module in the plant.

The hollow fiber system has severe disadvantages because of the difficulty involved in subjecting it to any kind of cleaning or flushing operation. Thus blockage of the high pressure side of the module by sludge or other deposits necessitates the complete replacement of the tube bundle. Complete replacement is also necessary when any significant number of fibers fail. Furthermore, the requirement that the fiber be contained in a high strength pressure vessel also lessens the usefulness of the hollow fiber system.

Prior art techniques for forming porous membrane surfaces for reverse-osmosis apparatus generally have been limited to casting operations which consist of mechanically smearing a fluid casting solution either on a flat forming plate or in a rigid tube to form a film, and then subjecting the film to an atmospheric drying and/or immersion in water. The mechanical smearing of the fluid casting solution must be performed within a rigid and impermeable tubular support when a tubular membrane is desired. The tubular membrane then must be removed from the tubular support used for casting and later reinserted into a porous tubular support for use in reverse-osmosis processes.

In accordance with the present invention, a permeable tubular membrane can be formed within a porous tubular support, avoiding the complexities of these prior art procedures. The present invention allows the production of reverse-osmosis membranes and their cleaning to be carried out within an assembled plant, and further allows the regeneration of a membrane film within the support tube when required.

This invention, as embodied and broadly described, includes a process for forming a tubular member comprising introducing a film-forming liquid into a tubular support, forcing the liquid through the tubular support with a pressurized gas column to form a film of liquid on the inner wall of the tubular support, and curing the film of liquid to form a solidified tubular member.

The invention also includes a process for forming a structure useful in reverse-osmosis procedures, which comprises introducing a film-forming liquid into one end of a porous tubular support, forcing the liquid axially along the tubular support with a pressurized gas column to form a film of liquid on the inner wall of the tubular support, and curing the film of liquid to form a permeable tubular membrane within a porous tubular support.

The present invention also includes a process for the purification of saline water which comprises forming a structure comprising a permeable tubular membrane within a porous tubular support by the procedure described above and forcing saline water under pressure axially along the interior of the structure to recover water having a low salt concentration on the outside of the tubular support by reverse osmosis. When the membrane requires servicing because of scale buildup or otherwise, the membrane is merely dissolved, and a new membrane is substituted for it by again introducing a film-forming liquid into the porous tubular support, and forcing the liquid through the tubular support with a pressurized gas column to form a film of liquid on the inner wall of the tubular support, and curing the film of liquid to form a permeable tubular membrane within a porous tubular support. Saline water purification is then reinitiated by forcing water having a high salt concentration along the interior of the structure under pressure to recover water having a low salt concentration on the outside of the tubular support by reverse-osmosis.

The invention also includes an apparatus for forming a tubular member, comprising (a) tubular support means for supporting the tubular member during the forming operation, (b) means for supplying a film-forming liquid to the interior of said tubular support means, (c) means for forcing a column of gas axially along the interior of said porous tubular support means to force the liquid axially along said tubular support means and form a coating of liquid on the inner wall of said tubular support means, and (d) means for forcing a curing fluid axially along the interior of said tubular support means to cure the coating of liquid and to form a tubular member.

Another apparatus included within this invention is a module for use in reverse-osmosis procedures, comprising a plurality of stacked helical coils of porous tubular support, each of the coils having a tubular membrane concentrically adhered to its inner surface, with the membranes extending substantially the entire length of the coils, an inlet manifold for supplying a liquid having a high salt concentration at one point in the interior of each of the tubular membranes, and an outlet manifold for receiving liquid that passes along the interior of said tubular membrane at a second point spaced from the first point.

The invention also includes a reverse-osmosis apparatus comprising porous tubular means for supporting a permeable membrane, means for intermittently supplying a film-forming liquid into the tubular means, means for intermittently forcing a column of gas through the tubular means to form a coating of liquid on the inner wall of the tubular means, means for intermittently forcing a curing fluid axially along the tubular means to cure the coating of casting liquid and form a tubular membrane, means for supplying an aqueous solution having a high salt concentration, under pressure, to the inside of the tubular membrane, means for collecting water having a low salt concentration at the outside of the porous tubular means, and means for intermittently dissolving the tubular membrane.

It is to be understood that both the foregoing general description and the following detailed description are exemplary and explanatory but are not restrictive of the invention.

The accompanying drawings, which are incorporated in and constitute a part of this specification, illustrate embodiments of the invention, and together with the description, serve to explain the principles of the invention.

Of the drawings:

FIG. 1 is a cross-section of a tubular support with a tubular membrane formed therein in accordance with the invention;

FIG. 2 is a cross-section of another tubular support with a tubular membrane formed therein in accordance with this invention;

FIG. 4 is a schematic view of one embodiment of a desalting module; and

FIG. 5 is a cross-section of a coiled length of the tubular support material of FIG. 4 with a tubular membrane concentrically aligned therein.

Figure 3:
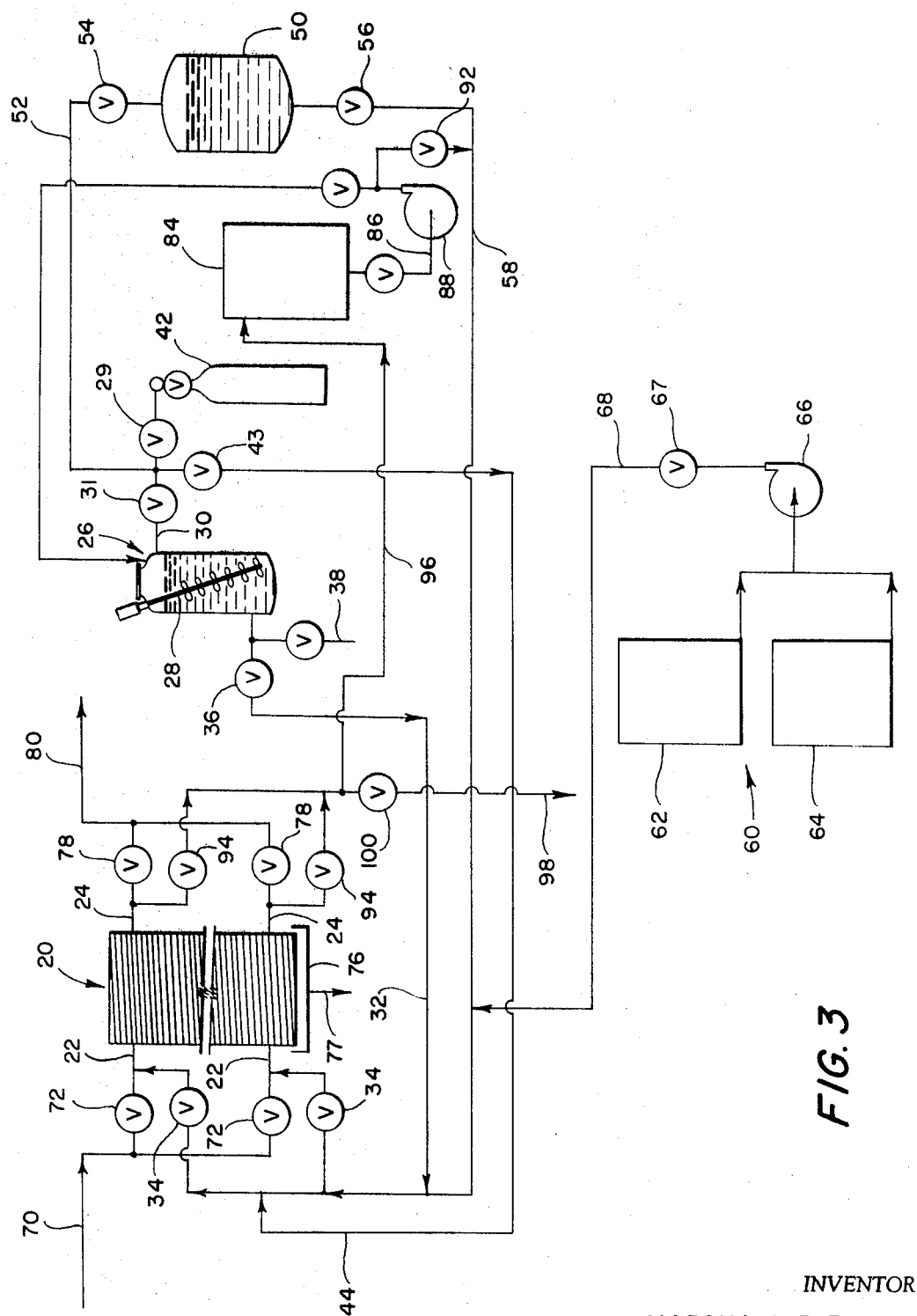
FIG. 3 is a flow sheet of means for effecting membrane formation and regeneration in a reverse-osmosis desalination plant.

The term "permeable" as used in this application refers to the ability of the tubular membranes to allow a selective flow of water from aqueous solutions through them. The term "porous" refers to the ability of tubular supports to allow passage of aqueous liquids through them. When percentages are expressed for compositions, they are weight percentages unless otherwise noted.

The hydroforming processes of the invention provide for the formation of a solid tubular member from a variety of liquid materials that can be forced through a tubular support by a pressurized column of gas to form a film of liquid on the inner wall of the tubular support, and thereafter cured to form a solid tubular member. In their broader applications, the processes provide for the formation of solid fluid-permeable and fluid-impermeable coatings on the interior walls of permeable and impermeable tubular supports. Thus, the hydrodynamic process for forming a tubular member can be used to line pipes with a conventional film-forming liquid, such as paint, asphaltic material, and synthetic organic polymeric material, that can be cured to form a solid coating.

It should be noted that the tubular members formed by the hydrodynamic process can be useful independently of the tubular support in which they are formed. For example, a tubular member can be formed in one tubular support and taken from and used independently of the tubular support or be inserted into another tubular member.

In a specific application, the hydroforming process allows the preparation of reverse-osmosis membranes within porous tubular supports. The resulting structures can be arranged to occupy a very small volume with respect to the area of active membranes they supply.

In the present hydrodynamic processes, tubular members are formed by blowing a film-forming liquid through a tubular support. The liquid is introduced within the tubular support and a column of gas is used to force the liquid axially along the interior of the support. A portion of the film-forming liquid remains on the inner wall of the tubular support and is subsequently cured to form a solid tubular member.

The important physical properties of the casting liquid used in hydroforming include viscosity and surface tension. The amount of casting liquid that remains on the inner wall of the tubular support as a film is believed to be a direct function of the viscosity of the liquid and linear velocity of the liquid and an inverse function of the surface tension of the liquid. Viscosity is also an important property of the casting liquid because it has a substantial effect on the flow rates and pressures which must be used in the hydroforming operation.

By using gas bubble pressures, it is possible to force even highly viscous fluids through a tubular support. Casting liquids having a surface tension of about 20 to 40 dynes/cm. produce useful films because this range allows a good combination of the spread of the liquid over the entire surface and adherence of the film to all areas.

The density or specific gravity of the film-forming liquid is of importance when a following column of liquid is used to force the gas column or bubble through the tubular support. The specific gravity of the film-forming liquid should be kept as close as possible to the specific gravity of the following column of liquid to minimize gravitational distortion of the film of liquid during the passage of the following column of liquid along the film.

It is presently preferred that the film-forming liquid include a film-forming constituent and a liquid carrier material that dissolves or suspends the film-forming constituent. The carrier material is selected to allow its removal from the film-forming constituent after formation of the film on the inner wall of the tubular support. Removal of the carrier material may be by evaporation, but preferably a column of leaching fluid is passed through the hydroformed annular film to leach the carrier material from the film-forming constituent. The leaching fluid used in this process should, of course, be a solvent for the carrier material, but a nonsolvent for the film-forming constituent.

Generally, a tubular member may be formed according to the present process in any tubular support of a suitable diameter. However, it will be obvious to one skilled in the art that the absence of sharp changes of direction in the tubular support will result in the formation of a more uniform tubular member.

The tubular support should be able to withstand hydroforming and normal operating pressures. It is possible, however, to position a reinforcing sleeve around the tubular support to enable it to resist hydroforming pressures so that inherent resistance to distortion during hydroforming is not a critical requirement.

While the specific hydroforming processes discussed below and illustrated in the specific examples disclose the formation of tubular members in tubular supports having a relatively small diameter, the broad process of this invention is suitable for forming tubular members having larger outside diameters within tubular supports which have correspondingly larger diameters. In general, the only effective limitations on the diameter of the tubular members that may be formed are gravitational effects and these can be overcome to some extent by passing the forming bubble through the tubular support at rapid velocities and by vertically orienting the tubular support.

In accordance with the present process, the film-forming liquid is forced through the tubular support with a pressurized gas column to form a film of liquid on the inner wall of the tubular support. In general, the gas used to blow the liquid through the tubular support may be any gas or gaseous mixture that does not chemically react with the casting liquid to hinder the blowing operations. In many casting operations, air can be satisfactorily used for forcing the casting liquid through the tubular support.

Use of a short column or bubble of gas rather than a long gas column minimizes gravitational effects on the film of casting liquid prior to its curing. For example, bubble lengths of one inch and smaller can be used to form a tubular member.

The speed of forcing the casting liquid through the tubular support affects the thickness of the film of casting liquid formed on the inner wall of the tubular support. It has been found that up to certain speeds, increases in blowing speed (the speed of the column of pressurized gas through the tube) produces an increased wall thickness of the deposited tubular member. Thereafter, further increases in blowing speed do not significantly affect the deposited membrane thickness.

Experimental studies by Taylor, reported in Fluid Mechanics, volume 10, pp. 161–164 (1961) and Fairbrother and Stubbs, reported in J. Chem. Soc., p. 527 (1935) indicate that the fraction $m$, of the fluid remaining in a tube filled with a viscous liquid is related to the translational speed of a gas column inside the tube $U$, and the mean speed of the fluid at the end of the fluid-filled tube $U_m$, as follows:

$$m = \frac{U - U_m}{U}$$

In the final step of the broad process of this invention, the film of liquid is cured to form a solid tubular membrane. This curing step preferably begins immediately after the passage of the pressurized gas column through the tubular support. Immediate curing reduces gravitational distortion of the liquid film formed on the interior of the tubular support.

After formation of the film of liquid on the interior walls of the support, the liquid remains fluid and will tend to flow under gravitational forces to produce a tube of irregular wall thickness. It is desirable, therefore, to cure the film of liquid before gravitational effects cause this undesirable flow. A wide variety of drying, heating, and polymerization techniques known in the liquid coating art may be used to cure the tubular member.

It has been discovered that a particularly effective procedure for curing tubular members formed by the process of this invention is to follow the gas bubble which forms the film with a fluid that begins curing the tubular film of liquid. For example, when a liquid containing a film-forming constituent and a carrier material is utilized, it is desirable to force a column of leaching fluid, of the type previously described, through the interior of the tubular film of liquid immediately after the column of gas.

A specific application of the process of the invention lies in the formation of a structure useful in reverse-osmosis procedures. It has previously been difficult or impossible to form, in a single operation, a structure including a permeable tubular membrane concentrically aligned inside a porous tubular support. Also, prior mechanical casting techniques have not been useful in casting a tubular member within a curved flexible tubular support.

In general, the tubular supports used in the present process to form the structures useful in reverse-osmosis should have sufficient mechanical strength to withstand the bursting pressures which may be applied to them both during hydroforming and during use in desalination; should be sufficiently porous that only an insignificant pressure drop occurs across the tube during desalting operations; and should have pore sizes small enough so that only an insignificant amount of carrier fluid will flow through the pores during hydroforming.

The porous support tubes should be resistant to corrosion and deterioration by salt water and be relatively insoluble in at least one material that is a solvent for the hydroformed membrane. The support tubes can be constructed of a variety of materials including stainless steel, fiber glass laminates of epoxy and/or polyester, and braided glass fibers. Both rigid and flexible tubular supports may be used in the process.

Tubular supports having an inside diameter of ¼ in. or less are desirable for use in the formation of reverse-osmosis apparatus. Preferred porous tubular supports are ¼ inch to ⅛ inch inside diameter support tubes formed of the materials listed in the preceding paragraph.

FIGS. 1 and 2 illustrate the cross-section of two structures produced in accordance with this invention which are useful in reverse-osmosis apparatus. FIG. 1 illustrates a porous tubular support 10 having a permeable tubular membrane 12 formed therein.

FIG. 2 illustrates a composite tubular support, and tubular membrane structure including a solid tubular support 16, that has a series of radially drilled holes 18, provided for the outflow of product water. A highly waterporous tube 14 is formed within a tubular support 16 by an initial hydroforming process. Subsequently, a permeable tubular membrane 12 is hydroformed within porous tube 14, with the latter acting as a support for the permeable membrane 12.

A variety of casting liquids can be used in the process of this invention to form structures useful in reverse-osmosis procedures. The casting liquids disclosed in Patents 3,133,132; 3,133,137; 3,170,867; and 3,130,488, listed above are exemplary.

Most desirable casting liquids include a cellulosic derivative and a liquid carrier material that permits the structural organization of a permeable membrane from the cellulosic derivative after removal of the carrier solution. The preferred film-forming cellulosic derivatives utilized in the process include cellulosic derivatives having the formula:

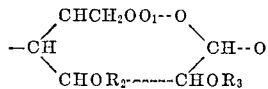

wherein $R_1$, $R_2$, and $R_3$ are members of a group consisting of alkyl groups containing 1 to 8 carbon atoms and radicals of the formula $CR_4O$, where $R_4$ is an alkyl group containing 1 to 7 carbon atoms. Specific examples of such cellulosic derivatives are cellulose acetate, cellulose acetate-butylrate, cellulose propionate and ethyl cellulose.

The liquid carrier used in the present process should cooperate with the cellulosic derivative to form pores in the tubular film of casting liquid so that a permeable membrane is produced when the carrier is removed from the cellulosic derivative. The carrier can consist of an aqueous solution of acetic acid or substantially anhydrous acetic acid. Alternatively, the carrier can be an organic solvent having a pore-producing organic compound or salt dissolved therein.

The carrier preferably includes an organic solvent such as acetone, dimethyl formamide, methylethyl ketone, ethyl alcohol, methyl alcohol, and mixtures of the above solvents. Acetone is a particularly desirable carrier material.

The weight ratio of organic solvent to cellulosic derivative is normally in the range of about 2/1 to 6/1, with a ratio of about 3/1 being preferred.

Presently preferred casting liquids for formation of reverse-osmosis membranes comprise ternary systems of acetone, formamide and cellulose acetate. These preferred compositions have a viscosity of from about 100 to 1000 poise and surface tension of from about 30 to 40 dynes/cm. Optimum compositions contain about 25% of cellulose acetate, 45% acetone, and 30% formamide, by weight.

After the casting liquid has been prepared and introduced into a porous tubular support, the casting liquid is forced axially along the tubular support with a pressurized gas column to form a film of liquid on the inner wall of the tubular support in a manner which has been fully described above. However, if the gas column or bubble is too short, it may disappear before the desired length of tubular membrane is formed. The reason for the disappearance of the gas bubble has not been definitely ascertained, but it is believed that the gas dissolves in the film-forming liquid.

In the final step of the present process, the film of casting liquid is cured to form a structure that includes a permeable membrane located concentrically within a porous tubular support. When the preferred film-forming liquids comprising cellulosic derivatives and a carrier material are used, this curing step can be carried out by using a column of cold water to force the gas bubble along the tubular support, and then continuing to force cold water through the tubular assembly until gellation of the cellulosic derivative has been accomplished and the carrier solution has been removed. This cold water conditioning usually takes from about 15 to 30 minutes when water at 4 to 15° C. is used. However, water up to room temperature may be used to gel the cellulosic derivative.

Subsequently, it is desirable to increase the salt rejection rate of the tubular membrane by forming an active skin on the interior of the cellulosic tubular membrane. This skin can be produced by passing a column of heated fluid, such as water or air, at an appropriate controlled temperature along the interior of the tubular membrane. Preferred skin activating conditions are achieved by contacting the membrane with a column of water at 70 to 90° C. for from 10 to 30 minutes. Thereafter, the system is again flushed with a final cold water stream.

An apparatus for practicing the hydroforming process of this invention and for use in a serial process for the desalination of water is illustrated in FIG. 3. The apparatus includes a helical, porous tubular support, generally 20, having inlet lines 22 and outlet lines 24 connected to its interior.

In accordance with the invention, means are provided for supplying a film-forming liquid into the interior of the tubular support. As here embodied, these means include a pressurized liquid reservoir, generally 26, provided with a mixer 28, a source of high pressure gas 30, and a liquid supply line 32 connected to inlet lines 22 by shutoff valves 34 so that liquid can be intermittently supplied to the interior of tubular support 20.

A shutoff valve 36 is provided in liquid supply line 32 and a valved sampling line 38 is provided so that samples of the film-forming liquid may be taken and tested. High pressure gas line 30 is connected to the upper portion of reservoir 26 through valves 29 and 31 and is used to force the film-forming liquid into the tubular support 20.

In accordance with the invention, means are provided for forcing a column of gas axially along the interior of porous tubular support 20 to force the film-forming liquid axially along the tubular support and to form a coating of liquid on the inner wall of the porous tubular means. As here embodied, these means comprise a high pressure gas cylinder 42 connected by valves 29 and 43 to gas bubble forming line 44. In turn, the gas bubble forming line is connected to liquid supply line 32. This arrangement allows the intermittent formation of a gas bubble behind a column of film-forming liquid within tubular support 20.

In accordance with this invention, means are provided for forcing a curing fluid axially along the interior of the tubular support to cure the coating of film-forming liquid and form a tubular member.

These means include cold water storage tank 50 connected to the source of high pressure gas by line 52 and valves 29 and 54. Cold water can be forced under pressure from storage tank 50 through valve 56 and into line 58 connected to inlet lines 22 of tubular support 20. Thus, a following column of liquid may be supplied from storage tank 50 to force the column of gas supplied by line 44 through the tubular support, and to cure the coating of film-forming liquid.

The apparatus of this invention also includes means for final activation of the inner membrane skin. These activation means, as embodied in FIG. 3, include membrane conditioning means, generally 60, that comprises a hot water supply 62 and a cold water supply 64 each connected to pump 66. Pump 66 is connected by valve 67 and line 68 to inlets 22 of tubular support 20. Thus, membrane conditioning fluids can be intermittently forced through the interior of the membranes formed by the present processes.

The apparatus of FIG. 3 also includes a saline water feed line 70 connected to inlet lines 22 by valves 72. Thus, saline water can be fed to the interior of the porous tubular membrane.

The saline feed water flows along the interior of the tubular membrane and product water is forced through the permeable walls of the tubular membrane and the porous tubular support, and falls by gravity into a catch basin 76. The purified water then can be removed through line 77. Concentrated brine flows through the interior of the tubular membrane, into outlet lines 24 through valves 78, and then into brine disposal line 80.

The apparatus of FIG. 3 also provides means for dissolving the tubular membrane, including a solvent storage tank 84 connected by line 86 to pump 88 that is in turn connected to casting liquid makeup line 90. Storage tank 84 is also connected through line 86, pump 88, and valve 92 to line 58.

In the embodiment illustrated in FIG. 3, a solvent for the film-forming constituent of the casting liquid can be intermittently cycled through porous tubular support 20 to dissolve the tubular membrane. The membrane is dissolved by pumping solvent from storage tank 84 through valve 92, line 58, and inlet lines 22 into and axially along tubular support 20. The solvent and the dissolved membrane material are then cycled through outlet lines 24, valves 94 and line 96, back into carrier storage tank 84.

The apparatus of FIG. 3 also includes a waste line 98 connected by valve 100 to line 96 to provide for removal from the system of the hot and cold water used to cure the membrane. Further, during the initial period of dissolving the spent membrane from tubular support 20, any material accumulated by the membrane can be removed from the system via waste line 98.

In operation of the apparatus of FIG. 3 in the desalination of water having a high salt concentration, a permeable tubular membrane is formed within tubular support 20. This membrane can be formed by supplying a cellulose acetate-formamide-acetone film-forming liquid from reservoir 26, through valve 36, valves 34, and inlets 22 into tubular support 20. Valve 36 is then closed to terminate the flow of the film-forming liquid, and valves 34 are subsequently closed.

Valve 43 is then opened to bring the gas pressure in line 44 to a predetermined level, and then closed.

A column of water from cold water storage tank 50 is then forced through liquid supply line 58. This column of water traps gas bubbles on the upstream side of valves 34, and, when valves 34 are opened, the column of water forces the air bubbles and the casting liquid through the tubular support 20 to form a film of liquid on the inner wall of tubular support 20.

The cold water from reservoir 50 which then passes along the interior of the tubular membrane gels the cellulose acetate and removes the acetone-formamide carrier material. During this conditioning operation valves 94 adjacent the outlets 24 and valve 100 in waste line 98 are opened to dispose of the water-carrier mixture.

After flow of the cold water column is discontinued, hot water from supply 62 is passed along the interior of the membrane to produce an active skin on the interior of the membrane. This active skin increases the salt rejection of the membrane.

Subsequently, cold water from supply 64 is pumped along the interior of the membrane and the membrane is ready for use in desalination.

Valves 72, adjacent inlets 22, and valves 78, adjacent outlets 24, which were closed during the membrane formation operations are opened and saline water is forced under pressure through line 70 into the interior of the tubular membrane. Product water having a substantially lower salt concentration than the saline feed permeates the walls of the tubular membrane and the walls of tubular support 20 and drops from the outer surfaces of tubular support 20 into a catch basin 76.

A concentrated brine flows from outlets 24, through valves 78, and into brine disposal line 80.

When the tubular membrane needs servicing, valves 72 are closed, to shut off saline water feed line 70, and valves 78 are also closed. The tubular membrane is then dissolved by passing solvent from storage tank 84 through line 58, valves 34 and along the interior of the tubular membrane. The dissolved membrane and solvent can be cycled to storage tank 84 or eliminated from the system through line 98.

After the tubular membrane is dissolved, it can be regenerated in tubular support 20 by the procedure outlined above for initial formation of the tubular membrane. Subsequently, saline water can again be forced under pressure along the interior of the regenerated tubular membrane to restart the reverse-osmosis, water-purification operations.

FIGS. 4 and 5 illustrate one embodiment of a desalting module of this invention. This module includes an inlet manifold 110; a plurality of tubular supports formed by coiled lengths 112 of porous tubular support material; and a plurality of permeable tubular membranes 113 concentrically aligned with each length 112 of porous tubular material. A central liquid passage 115 is formed within the interior surface of tubular membranes 113. One end of each passage 115 is connected to the inlet manifold 110 which extends along an axis that connects the center of each of the coiled lengths 112 of support material. The other end of each passage 115 and coiled lengths 112 of tubular material are connected to a brine manifold 114. A saline feed is introduced into the inlet manifold 110 by feed line 116. Forcing the saline feed through the length of passage 115 results in product water flowing through the membrane and the tubular support and falling by gravity for collection. Concentrated brine flows out of the end of tubular membranes 113, into brine manifold 114 and then into a brine disposal line 118.

For a clearer understanding of the processes of this invention, specific examples are set forth below. These examples are merely illustrative and are not intended to limit the scope and underlying principles of the invention in any way.

EXAMPLE 1

The physical properties of cellulose acetate-acetone-formamide film-forming liquids are investigated in this example. The following tables show the viscosity of casting liquids including E398–10 grade cellulose acetate sold by Eastman Chemical Co.

| Sample No.: | Composition, percent by weight | | | Viscosity (poise) |
| --- | --- | --- | --- | --- |
| | Cellulose acetate | Formamide | Acetone | |
| 1 | 25 | 30 | 45 | 290 |
| 2 | 23.8 | 28.6 | 47.6 | 83 |
| 3 | 20 | 15 | 65 | 36 |

The surface tension of this film-forming liquid is difficult to measure because of the volatility of the acetone, but can be calculated by a method given in Perry's Chemical Engineering Handbook, 4th Edition at page 3–222. The following table shows the calculated viscosity of some typical film-forming liquids.

|  | Composition | | | | | | |
| --- | --- | --- | --- | --- | --- | --- | --- |
|  | 1 | 2 | 3 | 4 | 5 | 6 | 7 |
| Cellulose acetate, wt. percent | 30 | 30 | 25 | 20 | 25 | 25 | 30 |
| Formamide, wt. percent | 5 | 10 | 10 | 15 | 30 | 40 | 45 |
| Acetone, wt. percent | 65 | 60 | 65 | 65 | 45 | 35 | 25 |
| Surface tension, dynes/cm | 24.9 | 27.3 | 27.6 | 29.7 | 37.8 | 44.2 | 46.6 |

EXAMPLE 2

In this example, cellulose acetate film-forming liquids are hydroformed in glass tubes of various diameters, at varying velocities, with Argon gas as the formation medium and are tested to determine the relationship between $m$, the ratio of $$\frac{\text{fluid remaining in the tubular support}}{\text{fluid in filled tubular support}}$$

and the non-dimensional parameter $\mu U/T$ where $\mu$ is the viscosity of the liquid, U is translational speed of the liquid, and T is surface tension of the casting liquid.

The equipment used consists of a tubular support formed of a four foot horizontal length of glass tubing filled with film-forming liquid, and having one of its ends connected to a gas reservoir and manometer pressure gage. The other end of the tubing is connected to a pressure compensating system which maintains a constant pressure differential across the casting liquid plug, and thus a constant velocity of the casting liquid through the tubing. The value of $m$ is determined in each case by measuring the length of the filled portion ($l_o$) of the tube before the test, and the length of the blown portion ($l_b$) after the run.

$$\left(m = \frac{l_o}{l_b}\right)$$

The velocity of the gas-liquid meniscus is measured by timing its progress between two reference points on the glass tube.

The casting liquid is introduced into the support tube under gas pressure supplied by means of a pressurized container.

Glass tubes varying in diameter from ½" to about ⅛" are used, but with the equipment used in these tests, the larger sizes—over ¼"—produce variable results at slow blowing speeds, because the air bubble tends to float on the casting liquid layer. In smaller diameter tubing, surface tension predominates, and consistent results are obtained.

The test results given below are for glass tubes varying in diameter from about 0.29 cm. to 0.05 cm.

| Glass support tube dia., cm. | Casting liquid viscosity ($\mu$), poises | Casting liquid surface tension (calculated) (T), dynes/cm. | $m$ | Translational speed of air bubble (U), cm./sec. | $\mu U/T$ |
| --- | --- | --- | --- | --- | --- |
| 0.289 | 19.0 | 29.5 | 0.312 | 0.233 | 0.150 |
| 0.289 | 19.0 | 29.5 | 0.393 | 0.510 | 0.328 |
| 0.289 | 19.0 | 29.5 | 0.406 | 0.538 | 0.346 |
| 0.289 | 19.0 | 29.5 | 0.461 | 0.952 | 0.613 |
| 0.289 | 19.0 | 29.5 | 0.490 | 1.176 | 0.756 |
| 0.289 | 19.0 | 29.5 | 0.532 | 2.50 | 1.61 |
| 0.289 | 19.0 | 29.5 | 0.484 | 2.000 | 1.288 |
| 0.289 | 19.0 | 29.5 | 0.491 | 1.739 | 1.12 |
| 0.289 | 19.0 | 29.5 | 0.263 | 0.167 | 0.1075 |
| 0.289 | 19.0 | 29.5 | 0.524 | 2.564 | 1.653 |
| 0.289 | 87.5 | 29.7 | 0.549 | 0.827 | 2.44 |
| 0.289 | 87.5 | 29.7 | 0.543 | 0.885 | 2.61 |
| 0.289 | 87.5 | 29.7 | 0.508 | 0.580 | 1.715 |
| 0.289 | 87.5 | 29.7 | 0.460 | 0.276 | 0.814 |
| 0.289 | 87.5 | 29.7 | 0.337 | 0.071 | 0.209 |
| 0.266 | 19.0 | 29.5 | 0.504 | 2.500 | 1.61 |
| 0.266 | 19.0 | 29.5 | 0.506 | 2.15 | 1.383 |
| 0.266 | 19.0 | 29.5 | 0.489 | 1.694 | 1.09 |
| 0.266 | 19.0 | 29.5 | 0.421 | 0.878 | 0.571 |
| 0.266 | 19.0 | 29.5 | 0.384 | 0.572 | 0.360 |
| 0.224 | 87.5 | 29.7 | 0.505 | 0.394 | 1.168 |
| 0.224 | 87.5 | 29.7 | 0.463 | 0.240 | 0.706 |
| 0.224 | 87.5 | 9.380 | 0.154 | 0.454 | |
| 0.224 | 87.5 | 29.7 | 0.327 | 0.067 | 0.197 |
| 0.05 | 20 | 38 | 0.52 | 4.18 | 2.2 |

These results show that the ratio ($m$) of fluid remaining in the tube to fluid in the filled tube reaches an asymptotic value with increasing translational speeds (U).

EXAMPLE 3

An ethyl cellulose tubular member is produced by an apparatus essentially similar to that described in Example 2 including a glass tubular support of ⅛ in. inside diameter. The film-forming liquid includes ethyl cellulose as a film-forming constituent and acetone as a solvent. Blowing the liquid through the support tube is accomplished using a column of nitrogen at a pressure of 15 in. of mercury and a translational speed of about 1.5 cm./sec. Curing of the tubular member is accomplished by continuing the nitrogen flow for a period of about 20 minutes.

EXAMPLE 4

A cellulose acetate tubular member is produced by an apparatus essentially similar to that described in Example 2 including a glass tubular support of ⅛ in. inside diameter. The casting liquid includes cellulose acetate as a film-forming constituent and acetic acid as a solvent. Blowing the casting liquid through the support tube is accomplished using a nitrogen bubble at a pressure of 30 p.s.i.g. and a translational speed of about 1.0 cm./sec. Curing of the tubular member is accomplished by connecting a source of water to the inlet end of the tubular support and forcing this curing fluid behind the gas bubble and axially along the interior of the formed tubular member for about 20 minutes.

EXAMPLE 5

Long cellulose acetate membrane tubes are produced by an apparatus essentially similar to that described in Example 2 above, except that the glass tubular support is replaced by a long, helically coiled, impermeable high pressure nylon tube of 0.078" inside diameter. A supply of curing fluid is connected by a valve to the inlet end of the tubular support. The composition of the casting liquid is:

Cellulose acetate E398-10 grade (a product of Eastman chemical Co.)—25%
Formamide—30%
Acetone—45%
Viscosity—190 poises An air bubble is introduced into the tube, with the length of the air bubble at atmospheric pressure being adjusted so that, at the hydroforming pressure, it contracts to the desired length of about 1 inch. Cold water at 10° C., from a pressurized vessel, is connected to the system to force the gas bubble through the tubular support and to act as a curing fluid.

The velocity of the gas bubble is related to the pressure used. Pressures up to 800 p.s.i.g. are used, and bubble velocities varying between 0.5 to 2.0 cm./sec. result.

One specific set of operating conditions includes:

Operating pressure: 600 p.s.i.g.
Air bubble length at atmospheric pressure: 30 cm.
Mean linear velocity of bubble: 0.3 cm./sec.

During the run, the air bubble is reduced in length as it progresses along the tubular support. After about 20 feet the bubble apparently disappears. About 20 feet of flawless, symmetrical tubular membrane is extracted after heat treatment of the tube at 80° C. for 20 minutes with a column of water. This length coincides with the point of disappearance of the air bubble.

EXAMPLE 6

Several additional runs are made using the method and apparatus of Example 5, except that no gas bubble is used and water at a pressure of 600 p.s.i.g. is used to force the film-forming liquid through the tubular support. No tubes are produced by this method. The gelled cellulose acetate is formed into irregular strands with randomly distributed high porous sections. This example shows that a gas bubble is necessary to form uniform tubular members in the present hydroforming processes.

EXAMPLE 7

The procedure of Example 5 is repeated with the following variations:

Operating pressure: 800 p.s.i.g.
Air bubble length at atmospheric pressure: 36 inches
Mean liner velocity: 2 cm./sec.

The air bubble disappears after 30 feet and about a 30 foot length of tubing is formed.

EXAMPLE 8

A membrane tube is formed in a glass capillary support tube having an inside diameter of about 0.05 cm. using the general procedure of Example 5. An operating pressure of 50 p.s.i.g., and a gas bubble mean linear velocity of 1 cm./sec. are used. This procedure produces a uniform cellulose acetate tube about three feet long.

EXAMPLE 9

The salt rejection characteristics of membrane tubes produced by hydroforming are established in this example by testing a tubular membrane hydroformed from a film-forming liquid comprising 25% by weight cellulose acetate, 45% by weight acetone, and 30% by weight formamide. The tubular membrane is cured by passing cold water through the interior of the membrane for about 30 minutes. The support tube and membrane are subsequently heated in a water bath at 75° C. for 20 minutes and the membrane tube is withdrawn from the support tube.

The unsupported tubular membrane is tightly coiled around a solid core, one end being sealed, the other left open. The coil is immersed in a container of distilled water with the open end of the tube projecting above the water level and leading to a small collecting vessel. The inner part of the membrane tube is filled completely with a NaCl solution of known concentration. Osmotic transfer of water through the membrane into the saline solution results in solution being displaced into the collector. The amount of displaced solution is measured after about four hours and an analysis made of the displaced solution, the contents of the tube, and the water surrounding the membrane. From a salt balance for the system it is possible to calculate the membrane rejection coefficient under the conditions of the test.

The results are given in tubular form below.

Total tube length=310 cm.
Inner diameter=0.125 cm.
Total membrane area=122 cm.$^2$
Initial concentration of NaCl in tube=50,000 p.p.m.
Volume of NaCl solution in tube=3.81 cm.$^3$
Water transfer by osmosis=13.7 cm.$^3$ in 4 hours
Final volume of outer bath=36.8 cm.$^3$
Final concentration of NaCl in outer bath=3100 p.p.m.= 0.53 M
Final concentration of NaCl in solution contained in tube and osmotic transfer water=4400 p.p.m.
Mean concentration of solution in tube=27,200 p.p.m.= 0.465 M.

Effective salt concentration of solution permeating the membrane $$\text{membrane} = \frac{(36.8 \times 10^{-3}) \times (5.3 \times 10^{-2})}{(13.7 \times 10^{-3})} = 0.142 \text{ M}$$

$$\text{Rejection} = \frac{0.465 - 0.142}{0.465}$$
$$= 0.695$$

i.e. 69.5% salt rejection

EXAMPLE 10

A structure including a permeable tubular membrane inside a porous tubular support is formed. The film-forming liquid is a composition comprising:

| Compound: | Weight percent |
|---|---|
| Cellulose acetate | 25 |
| Acetone | 45 |
| Formamide | 30 |

The tubular support is of porous stainless steel having a 5 micron average pore size and having an inside diameter of ⅛ in. and is three feet long. An air bubble is used to form the tubular membrane. The bubble-formed tubular membrane is formed and cured by using a column of 5° C. water at 50 p.s.i.g. to force the gas bubble along the tubular support by continuing to pass cold water inside the membrane until it has gelled completely. Subsequently a column of water at 75° C. is forced along the interior of the membrane for about 20 minutes. Thereafter cool water is again passed along the interior of the membrane. When water having a salt concentration of 5000 p.p.m. is forced axially along the interior of the porous structure at a pressure of 800 p.s.i.g. under conditions of turbulence, water having a lower salt concentration permeates through the porous structure and can be collected at the outside of the tubular support. The water so collected has a salt content of 500 p.p.m.

EXAMPLE 11

The tubular membrane of Example 10 is dissolved by passing acetone along the interior of the membrane-support tube assembly. The porosity of the cleaned porous support tube is shown to be the same as before the initial membrane formation. A tubular membrane is subsequently regenerated in the tubular support by repeating the hydroforming technique described in Example 10.

The invention in its broader aspects is not limited to the specific details shown and described, but departures may be made from such details within the scope of the accompanying claims without departing from the principles of the invention and without sacrificing its chief advantages.

What is claimed is:

1. A serial process of recovering water having a low salt concentration from water having a high salt concentration comprising:
    (a) introducing a film-forming liquid into one end of a porous tubular support, forcing the liquid through the tubular support with a pressurized gas column to form a film of liquid on the inner wall of the tubular support, and curing the film of liquid to form a structure including a permeable membrane concentrically adhered within a porous tubular support;
    (b) forcing saline water under pressure axially along the interior of the structure to cause water having a low salt concentration to permeate through the permeable membrane and porous tubular support, by reverse osmosis, and recovering the low-salt concentration water at the outside of said support;
    (c) dissolving the membrane when it requires servicing;
    (d) regenerating the membrane by again introducing a film-forming liquid into the porous tubular support, forcing the liquid through the tubular support with a pressurized gas column to form a film of liquid on the inner wall of the support tube; and curing the film of liquid to form a structure including a permeable tubular membrane concentrically adhered within a porous tubular support; and
    (e) then again forcing water having a high salt concentration under pressure along the interior of the structure to recover water having a low salt concentration on the outside of the tubular support.

2. The process of claim 1 wherein the film-forming liquid comprises a cellulosic derivative and a carrier material that permits the formation of a permeable membrane of said cellulosic derivative when said carrier material is removed therefrom.

3. The process of claim 2 wherein the cellulosic derivative includes cellulose acetate, and the carrier material includes acetone and formamide.

4. The process of claim 3 wherein the pressurized gas column is an air bubble, and the air bubble is forced axially along the tubular support by a pressurized column of cold water that extracts acetone from the film-forming liquid and gels the cellulose acetate.

5. The process of claim 4 wherein the curing step includes passing hot water axially along the passage formed inside the tubular membrane to form an active skin on the inside wall of the tubular membrane and subsequently flushing the hot water with a column of cold water.

6. A reverse osmosis apparatus, comprising:
   (a) porous tubular support means for supporting a permeable membrane;
   (b) means for intermittently supplying a film-forming liquid to the interior of said porous tubular support means;
   (c) means for intermittently forcing a column of gas axially along the interior of said porous tubular support means to force the liquid axially along the tubular means and to form a coating of liquid on the inner wall of said porous tubular support means;
   (d) means for intermittently forcing a curing fluid axially along the interior of the tubular support means to cure the coating of liquid and form a tubular membrane;
   (e) means for supplying an aqueous solution having a high salt concentration under pressure to the inside of the tubular membrane;
   (f) means for collecting water having a low salt concentration at the outside of the tubular support means; and
   (g) means for intermittently dissolving the tubular membrane.

7. The apparatus of claim 6 wherein said porous tubular support means includes at least one compact, cylindrical module formed of a plurality of helical coils of flexible support tubing stacked in abutting relationship.

8. The apparatus of claim 7 wherein the flexible support tubing has an inside diameter of not more than ¼ inch.

References Cited

UNITED STATES PATENTS

| | | | |
|---|---|---|---|
| 2,864,506 | 12/1958 | Hiskey | 210—321 |
| 3,422,008 | 1/1969 | McLain | 210—23X |
| 3,198,335 | 8/1965 | Lewis et al. | 210—321 |
| 3,331,772 | 7/1967 | Brownscombe et al. | 210—23 |
| 3,446,359 | 5/1969 | Loeb et al. | 210—490 |
| 3,462,362 | 8/1969 | Kollsman | 210—321X |

FRANK A. SPEAR, JR., Primary Examiner

U.S. Cl. X.R.

210—321, 500